Jan. 11, 1966     H. L. LIBBY     3,229,198
EDDY CURRENT NONDESTRUCTIVE TESTING DEVICE FOR MEASURING
MULTIPLE PARAMETER VARIABLES OF A METAL SAMPLE
Filed Sept. 28, 1962     4 Sheets-Sheet 1

INVENTOR.
Hugo L. Libby
BY
Roland G. Anderson
Attorney

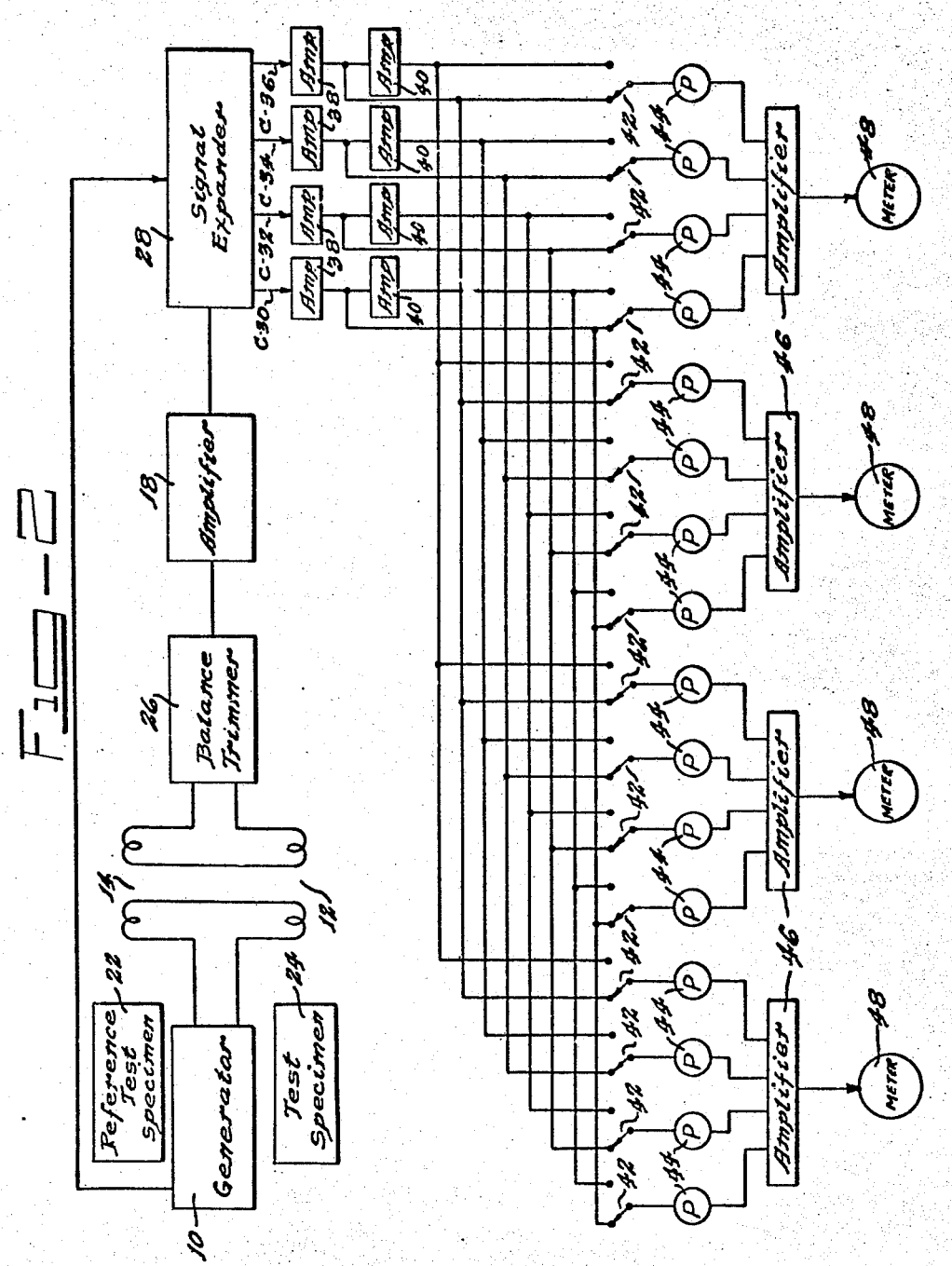

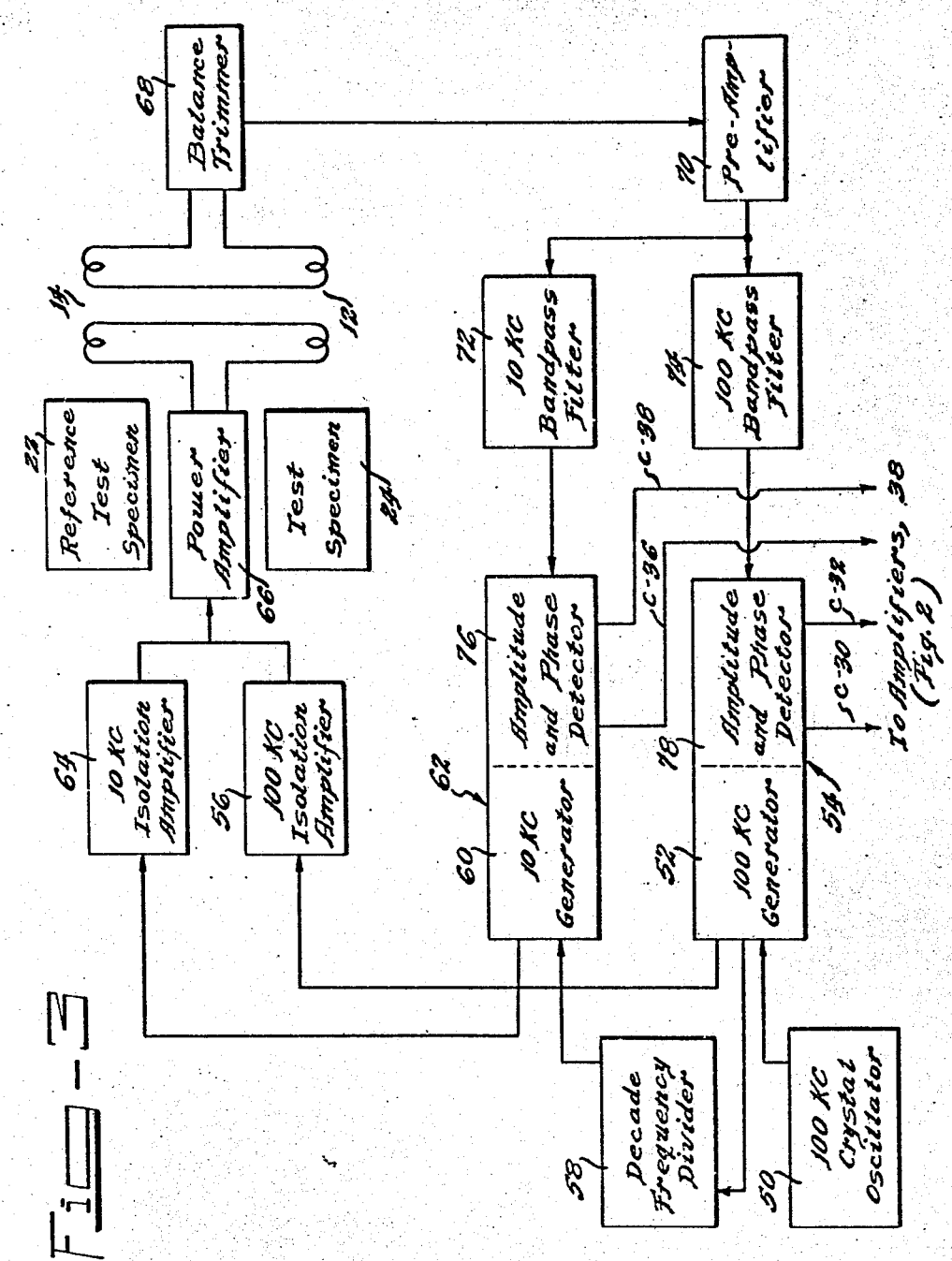

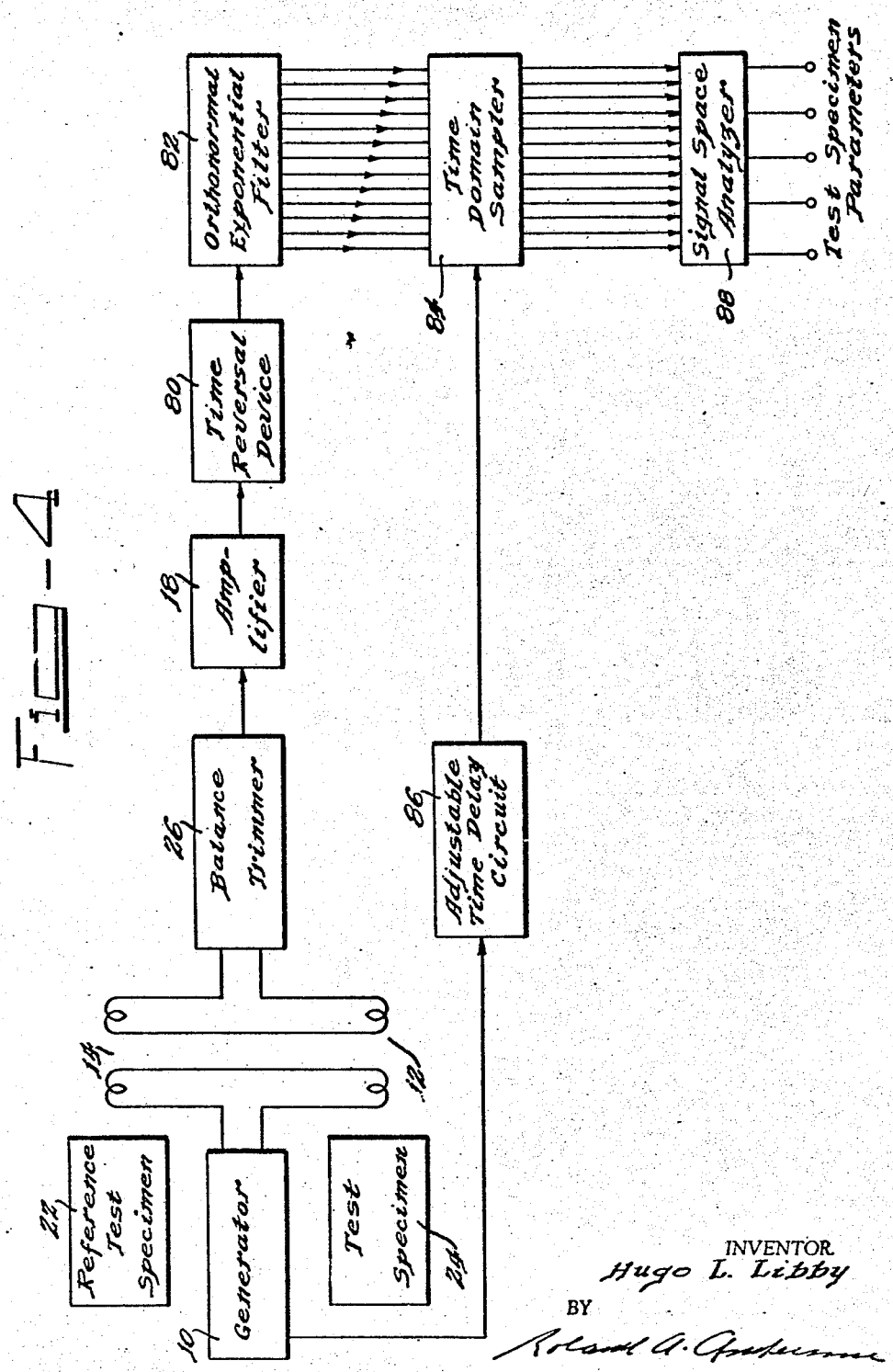

United States Patent Office 3,229,198
Patented Jan. 11, 1966

3,229,198
EDDY CURRENT NONDESTRUCTIVE TESTING DEVICE FOR MEASURING MULTIPLE PARAMETER VARIABLES OF A METAL SAMPLE
Hugo L. Libby, Richland, Wash., assignor to the United States of America as represented by the United States Atomic Energy Commission
Filed Sept. 28, 1962, Ser. No. 227,693
8 Claims. (Cl. 324—40)

This invention relates to nondestructive eddy current testing devices and more particularly to multiple parameter nondestructive eddy current testing devices. The invention described herein was made in the course of, or under, a contract with the U.S. Atomic Energy Commission.

The conventional nondestructive eddy current testing device uses a single test frequency which gives two pieces of information about the test specimen. These two pieces of information may be expressed either in polar or rectangular form from which it is possible to determine unambiguously the value of two test specimen variables or parameters. Thus, if one desires to measure metal plate thickness and electrical conductivity, it is possible to do this using a single test frequency. However, if one desires to determine a third variable such as probe-to-sample spacing, a single test frequency does not produce sufficient information to determine the three variables unambiguously.

Further, even where additional variables are not of direct interest, their effects may mask those of the main variables thereby reducing the effectiveness of the test. Thus, using a single frequency gives a limited amount of information which in some cases is sufficient but which generally leaves much of the test specimen information unrevealed.

It is therefore one object of the present invention to provide means for nondestructively measuring multiple parameters of a test specimen.

It is another object of the present invention to provide nondestructive eddy current means for simultaneously measuring multiple parameters of a test specimen.

It is another object of the present invention to provide a nondestructive eddy current device using multiple frequencies for measuring simultaneously multiple parameters of a test specimen.

Other objects of the present invention will become more apparent as the detailed description proceeds.

In general, the present invention comprises a probe coil and means to drive the probe coil with a signal having a broadband of frequencies. Means are then provided for analyzing the signal detected by the probe coil to give individual parameter values for the test specimen.

Further understanding of the present invention will best be obtained from consideration of the accompanying drawings in which:

FIG. 2 is a more detailed schematic diagram of the device of FIG. 1.

FIG. 3 is a detailed schematic diagram of the generator and signal expander section of the device of FIGURE 2.

FIG. 4 is an alternate schematic diagram of the analyzer section of the device of FIGURE 1.

Figure 1:
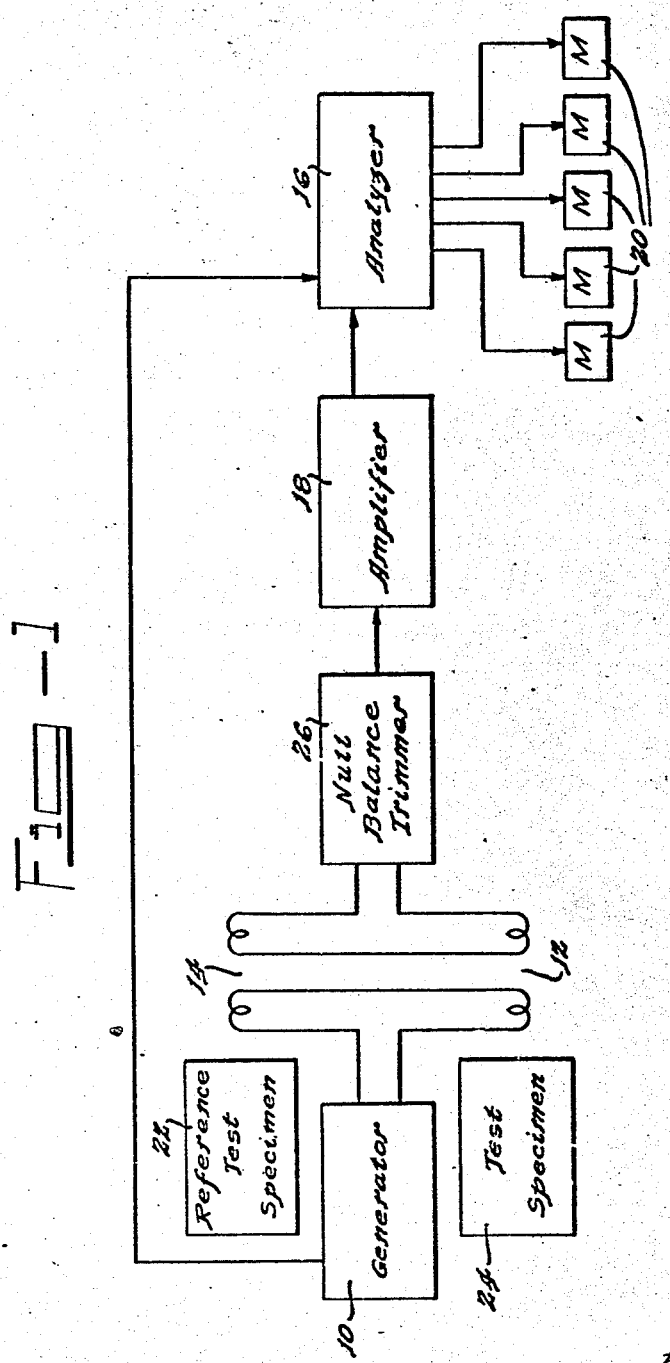
FIG. 1 is a schematic diagram of the preferred embodiment for the practice of the present invention.

In FIGURE 1, a generator 10 supplies a multidimensional excitation current to test coils 12 and balance coils 14. The generator 10 also provides a reference signal to analyzer 16. The output from test coils 12 and balance coils 14 is fed through amplifier 18 to the input of analyzer 16. The output of analyzer 16 has a plurality of parameter readout meters 20.

The operation of the device of FIGURE 1 is based upon the application of two basic principles in addition to those used in conventional eddy current nondestructive testing. The first principle is that more information can be carried by a broadband signal than one of a single frequency, and the second is that the broadband output from the test coils can be analyzed to give the desired information regarding test specimen parameters. It is to be noted that generally a particular parameter will affect each frequency in an applied broadband signal. However, it will affect each frequency differently. Further, the effect on each frequency between different parameters will generally not be the same.

In operation, the generator 10 supplies a multidimensional excitation current to test coils 12 and balance coils 14. The generator 10 also supplies a reference or timing signal to the analyzer section 16. The output of the generator may be in the form of single or repetitive pulses, combinations of rising or decaying exponential signals, or combinations of a number of sinusoidal signals. Thus, the excitation signal from generator 10 may be constructed to simplify the task of the analyzer section 16.

As stated, the output of the generator 10 is fed to the test coils 12. These coils are essentially similar in construction and operation to those of conventional eddy current nondestructive testing equipment except that they must be operable over the desired broad frequency bandwidth without generating spurious responses. The balance coils 14 are identical to the test coils 12 and using a reference test specimen 22, provide a null or near null signal input to the amplifier 18 for any desired condition of the test specimen 24. Due to unavoidable differences in coil assembly construction and the existence of stray coupling, it is difficult to obtain a null condition with only the balance coils 14. Therefore a trimmer balance unit 26 is used to provide a fine null adjustment. Balance trimmer unit 26 is of conventional design of the basic type described by Donald L. Waiderlich in "Pulsed Eddy Currents Gauge Plating Thickness," Electronics, November 1955, pages 146 and 147. Operation at or near a null signal permits observation of small parameter variations about nominal parameter values.

The null or near null input to amplifier 18 is amplified thereby before transmission to the analyzer 16. The amplifier 18 is a broadband amplifier having low noise and low distortion. In some cases, an automatic gain control circuit may be incorporated therein to reduce signal amplitude variations due to changes in signal caused by variations in coupling between the test coils 12 and test specimen 24.

The output from amplifier 18 is a complex signal which is accepted by analyzer 16 to give in response thereto a plurality of output signals each of which depends only upon an individual parameter value of the test specimen.

Reference is made to FIGURE 2 to further explain the operation of the device of FIGURE 1 and more particularly the analyzer section thereof.

The output from amplifier 18 is fed to a signal expander 28 wherein the signal is expanded so that the outputs $C_{30}$, $C_{32}$, $C_{34}$ and $C_{36}$ therefrom, called signal descriptors, represent the coefficients of the components of the signal on a selected basis. Thus, it is to be understood that the number of outputs shown herein and described are not limited to four, the number being chosen merely as illustrative for description and as representative of four parameter variables.

The outputs $C_{30}$, $C_{32}$, $C_{34}$ and $C_{36}$ are amplified by amplifiers 38 and then their polarity is reversed by operational amplifiers 40 so that both a negative and positive polarity coefficient exists for each signal descriptor output of the expander 28. The polarity of the coefficients of the outputs $C_{30}$, $C_{32}$, $C_{34}$ and $C_{36}$ are then selected by the polarity switches 42 and the polarity selected outputs $C_{30}$, $C_{32}$, $C_{34}$ and $C_{36}$ are then fed to potentiometers 44. The wiper arm outputs of the potentiometers 44 are fed to summing amplifiers 46 and thence to parameter readout meters 48, each meter thereby indicating a particular parameter under test.

To facilitate explanation of operation, the operation of the signal expander 28 will be described later. It is sufficient for the present description that the expander 28 expands the complex signal from amplifier 18 using Fourier series expansion. Thus the complex signal input is expanded on a Fourier series basis so that the descriptor outputs $C_{30}$, $C_{32}$, $C_{34}$ and $C_{36}$ represent the various coefficients of the Fourier series expansion of the signal. The signal descriptor outputs $C_{30}$, $C_{32}$, $C_{34}$ and $C_{36}$ from expander 28 are slowly varying D.-C. signals which are constant for a fixed set of test specimen parameters. As any test parameter changes, all the signal descriptors therefore will generally vary, but in slightly different degrees.

Generally, each signal descriptor varies nonlinearly with the test specimen 24 parameters. However, for small parameter changes the relationship between parameter change and signal descriptor change may be considered linear. The analyzer section 16 shown in FIGURE 1 and the detailed portions thereof shown in FIGURE 2 are based on this linear approximation.

Thus, for small changes in parameters of test specimen 24, the principles of linear anaylsis may be applied to give:

$$C] = [A]P]$$

where $C]$ = the signal descriptors $C_i$ arranged in a column matrix
$[A]$ = matrix relating the $P_i$ to the $C_i$
$P]$ = parameter values arranged in a column matrix The values of the $A_{jk}$ in $[A]$ can be determined experimentally by varying the parameters one at a time and reading the corresponding values of the signal descriptors. The values of the A's are then computed, being equal to the slope of the C versus P curves at the nominal values of the P's. Since it is the individual values of the parameters $P_i$ which are required, the equation $C] = [A]P]$ can be solved for P as follows:

$$P] = [A]^{-1}C] = [B]C]$$

where $[A]^{-1}$ or $[B]$ is the inverse matrix of the matrix $[A]$. The inverse matrix $[A]^{-1}$ is computed using standard matrix algebra techniques as the values of $A_{jk}$ are known. The individual values of the parameters can now be determined by multiplying the matrix $[B]$ and the column matrix $[C]$. This multiplication is performed by the polarity switches 42, the potentiometers 44 and the summing amplifiers 46. Thus, the polarities of the matrix elements $B_{jk}$ are selected by the switches 42, the amplitudes of the matrix elements $B_{jk}$ are set by adjusting the wiper arms of the potentiometers 44, and the summing amplifiers give outputs proportional to the existing test specimen parameter changes on which the calibration is based.

Reference is now made to FIGURE 3 for a more detailed explanation of an operational test signal generating apparatus and signal expander for the device of FIGURE 2. The apparatus of FIGURE 3 was used for analyzing resistivity changes in each layer of a four-layer sample. It is to be understood that the present invention is not to be limited to this number and type of parameter variable. Other parameter variables may be analyzed using the present invention, for example, the location, depth and presence of subsurface flaws and cladding thickness.

A crystal oscillator 50 generates a 100 kc. frequency which is transmitted to the 100 kc. generator section 52 of a commercial impedance comparator 54 (for example, General Radio impedance comparator, Type 1605-A). The output of the generator section 52, a 100 kc. signal, is fed to a 100 kc. isolation amplifier 56 and also to a decade frequency divider 58. The decade frequency divider 58 divides the 100 kc. input signal by ten to give an output signal of 10 kc. The 10 kc. output signal of the frequency divider 58 is fed to the 10 kc. generator section 60 of a second commercial impedance comparator 62. The output of the generator section 60, a 10 kc. signal, is fed to the input of a 10 kc. isolation amplifier 64. The outputs of isolation amplifiers 56 and 64 are fed to power amplifier 66 and then to test coils 12 and balance coils 14. The isolation amplifiers 56 and 64 prevent cross modulation between the 10 and 100 kc. generators.

The detected signal from test coils 12 and balance coils 14 is transmitted to a balance trimmer 68 to give a null or near null output for predetermined reference values. The output signal from balance trimmer 68 is transmitted through a preamplifier 70 to a 10 kc. bandpass filter 72 and a 100 kc. bandpass filter 74.

The output of the 10 kc. bandpass filter 72 is fed to the input of the amplitude-phase detector section 76 of the 10 kc. impedance comparator 62, and the output of the 100 kc. bandpass filter 74 is fed to the input of the amplitude-phase detector section 78 of the 100 kc. impedance comparator 54. The outputs $C_{30}$, $C_{32}$, $C_{34}$ and $C_{36}$ of the amplitude-phase detectors 74 and 78 are slowly varying D.-C. signals which are constant for a fixed set of test specimen parameters and which represent the Fourier expansion of their input signal. The outputs $C_{30}$, $C_{32}$, $C_{34}$ and $C_{36}$ are then fed to the amplifiers 38 of FIGURE 2.

As previously stated, the impedance comparators 54 and 62 are commercially available and each may be divided into two sections, a generator section and an amplitude-phase detector section. The oscillators in the generator sections 52 and 60 of the comparators 54 and 62 are not stable enough for the present device, hence, the 100 kc. crystal oscillator is used to achieve stability.

The frequency divider 58 comprises the usual input amplifier, a decade counter, and a bandpass filter. The input amplifier of the divider 58 drives the decade counter to give positive triggering and divide the frequency by ten. The bandpass filter thereof smoothes the 10 kc. output signal therefrom.

The 100 kc. crystal oscillator 50 as stated stabilizes the frequency of the generator sections 52 and 60 of the impedance comparators 54 and 62 and also results in synchronization of the two generator sections. The synchronization is important because without it, continual shifting of the 100 kc. signal with respect to the 10 kc. signal would occur throughout the system and undesirable difference frequencies could interfere with measurements.

The generator section of each of the impedance comparators 54 and 62 furnishes the phase detector reference voltage internally. Each of the impedance comparators 54 and 62 has two amplitude-phase detector circuits, one for indicating the amount of the signal in phase with a fixed reference signal, and one for indicating the amount of signal in quadrature with the fixed reference. The reference signal must have the same frequency as the signal being analyzed and it must be derived from or synchronized with, the original generator source of the test coil driving signal.

The D.-C. outputs $C_{30}$, $C_{32}$, $C_{34}$ and $C_{36}$ of the amplitude-phase detector sections 76 and 78 are thus proportional to the in-phase and quadrature components of the signal. The outputs $C_{30}$, $C_{32}$, $C_{34}$ and $C_{36}$ are not sinusoidal components themselves, but are direct currents proportional to these components. Thus, the outputs of a series of such amplitude-phase detectors represent the Fourier expansion of the signal, since they are proportional to the coefficients in a Fourier series representing the signal.

It is to be understood that the signal descriptors used need not be limited to the Fourier coefficients of the expanded signal, but may consist of other characteristics of the signal such as amplitudes of the signal sampled at different times, various derivatives of the signal measured at different instants, successive derivatives of the signal at the same instant, various integrals of the signal or various combinations of these characteristics. Reference is made to "Microsecond Sampler Handles 126 Channels," by M. T. Nadir, Electronics, January 23, 1959, page 26, and "Electronic Analogue Computers," by G. A. Korn and T. M. Korn, 2nd Ed., 1956, McGraw-Hill Book Co., Inc., for circuits capable of obtaining these characteristics. A necessary requirement is that sufficient independence exists in the relationships between the parameters and the descriptors to make the desired separation between parameters possible. In order to make use of descriptors other than the Fourier coefficients, the analyzer 16 in FIGURE 1, or more specifically, the signal expander 28 in FIGURE 2, would be designed to expand the signal in terms of the chosen descriptors.

As recited supra, the apparatus of FIGURES 2 and 3 is designed on the basis of an approximate linear relationship existing between parameter variations and the corresponding changes in test coil output signals. Where a nonlinear relationship occurs it has to be compensated for. For example, considerable compensation can be achieved by substituting nonlinear amplifiers for the linear amplifiers 38 shown in FIGURE 2. The characteristics of such amplifiers would be adjusted to compensate for the nonlinear variation of values of the outputs $C_{30}$, $C_{32}$, $C_{34}$ and $C_{36}$.

A multidimensional excitation current is herein defined to be a current represented by a superposition of more than two basis functions having prescribed amplitudes. Each basis function corresponds to a dimension of the excitation current. The basis functions are the characteristic functions of a generalized Fourier series expansion of the excitation current. For the purposes of this definition the word "multidimensional" means more than two dimensions. In the two-frequency case hereinbefore described, the four basis functions are the sine and cosine (or quadrature) components of the 10 kc. and 100 kc. excitation current. The amplitudes of the basis functions then represent the components of the four-dimensional current projected on four mutually orthogonal signal space axes.

In FIGURE 4, an alternate analyzer section is shown for the device of FIGURE 1. For the analyzer of FIGURE 4 the test coils and balance coils are driven with a broadband current function and the output of the coils is analyzed by expanding it into an N-dimensional signal space along specially selected coordinate axes.

The output signal from amplifier 18 is fed to a time reversal device 80 which serves to reverse the signal in time. This results in changing the signal from one which decays as time increases to one which grows as time increases since the latter is more easily operated on by the orthonormal filter 82. The construction of the time reversal device is as disclosed by Libby et al. in U.S. Patent No. 3,160,817, issued December 8, 1964.

The output of the time reversal device is fed to an orthonormal exponential filter 82 which expands the signal in terms of selected orthogonalized exponential components, and there appears at each terminal a running signal whose value at each instant represents the coefficient of that particular orthogonal component representing the signal for times prior to that instant.

The outputs from the filter 82 are fed to a time domain sampler 84 which samples each output from the orthonormal filter 82 at a selected time. The time of sampling is determined by a time pulse transmitted from generator 10 through a time delay circuit 86 to the time domain sampler 84. The time delay circuit 86 has an adjustable time delay and comprises a driven multivibrator, an adjustable phantastron pulse delay, and a blocking oscillator.

The outputs of the time domain sampler 84 are a series of voltages which remain constant as long as the test specimen parameters remain fixed, but which vary individually when the parameters change. These voltages represent the response vector in signal space on a basis dependent on the design of the orthonormal filters 82.

The outputs of the time domain sampler 84 are then fed to a signal space analyzer 88 which operates on the response vector to read out the various test specimen parameters individually. Generally, the operation of the space analyzer 88 depends on the design of the filter 82 and the selected driving function applied to the test coils 12. Thus the analyzer 88 may be of several forms. The first is where the orthonormal filter 82 together with the test coil drive functions are selected so as to make the various outputs from the filter 82 indicate the desired parameters independently. The second is where the analyzer 88 operates on the transmitted response function components to recombine them in linear and nonlinear circuits. The output of the sampler is determined experimentally for given variations in the parameters of the test specimen and the analyzer 88 is adjusted empirically to give an optimum independence of output readings. Third, the analyzer 88 is based on the hypothesis that the variation of each parameter of the test specimen generates by itself a geometrical object in N-dimensional signal space which can be identified with and calibrated in terms of that parameter irrespective of the values of the other parameters. Here, the parameter 88 gives a measure of the geometrical entities for each parameter and compares them with a precalibrated basis, performing the necessary interpolation and reading out the parameters independently.

Persons skilled in the art will, of course, readily adapt the general teachings of the invention to embodiments far different than the embodiments illustrated. Accordingly, the scope of the protection afforded the invention should not be limited to the particular embodiments illustrated in the drawings and described above, but should be determined only in accordance with the appended claims.

What is claimed is:

1. An eddy current device for measuring multiple parameter variable of a metal sample comprising a test coil, means for applying a multidimensional excitation current to said test coil, means for expanding the received signal of said coil into signals proportional to the coefficients of the Fourier expansion of said received signal, and means for combining said expanded signals to give a plurality of outputs each responsive to a variable parameter of said metal sample.

2. An eddy current device for measuring multiple parameter variables of a metal sample comprising a test coil, means for applying a multidimensional excitation current to said test coil, means for null balancing the received signal of said test coil for predetermined values of the variable parameters of said metal sample, means for expanding variations in received signal of said test coil from said null balance into signals proportional to the coefficients of the Fourier expansion of said variations in received signal, said expanded signals being linearly proportional to the variable parameters of said metal sample, and means for combining said expanded signals to give a plurality of outputs each responsive to a variable parameter of said metal sample.

3. The device according to claim 2 wherein said null balancing means comprise a reference coil identical to said test coil and excited by the same multidimensional current as said test coil, a reference metal sample having parameters of known value, and a balance trimmer unit, the received signal of said test coil and balance coil being fed to the input of said balance trimmer unit, the output of said balance trimmer unit being a null signal for parameter values of said metal sample being equal to parameter values of said reference sample.

4. The device according to claim 3 wherein said combining means comprise means for multiplying a matrix [B] and a column matrix C] for the solution of the equation $P] = [B] \ C]$, $P]$ being equal to the parameter values of said metal sample arranged in a column matrix, [B] being equal to the inverse matrix of the matrix relating the $P_i$ to $C_i$ and C] being equal to said expanded signals arranged in a column matrix, and means for adding the multiplied matrix elements $C_j \ B_{jk}$ in accordance with the solution of the equation $P] = [B] \ C]$.

5. The device according to claim 4 wherein said matrix multiplying means comprise means for amplifying said expanded signals, means for generating opposing polarities for each of said expanded signals, means for selecting the polarity of each of said expanded signals in accordance with the polarities of the $B_{jk}$ elements of the inverse matrix relating the $P_i$ to $C_i$ for the solution of said parameter values of said metal sample arranged in said column matrix, means for multiplying each of said expanded signals of selected polarity with the amplitudes of the $B_{jk}$ elements of the inverse matrix relating the $P_i$ to $C_i$ for the solution of said parameter values of said metal sample arranged in said column matrix, whereby the $B_{jk}$ elements of the inverse matrix are multiplied by said expanded signals arranged in a column matrix.

6. The device according to claim 5 wherein said multiplying means comprise a plurality of potentiometers, said expanded signals being applied across the terminals of said potentiometers and the wiper arms of said potentiometers being set at predetermined values proportional to the values of the $B_{jk}$ elements associated with the corresponding expanded signals, whereby the output of the wiper arms of said potentiometers represents the multiplication of the $B_{jk}$ elements of the inverse matrix and the column matrix of the expanded signals.

7. An eddy current device for measuring multiple parameter variables comprising a test coil, means for applying a multifrequency excitation signal to said test coil, means for filtering the received signal of said coil into the individual frequencies thereof, means for generating signals proportional to the amount of said frequencies in phase and in quadrature with like frequency reference signals derived from the excitation signal, said generated signals being proportional to the coefficients in a Fourier series expansion of the received signal, and means for combining said generated signals to give a plurality of outputs each responsive to a variable parameter of said metal sample.

8. An eddy current device for measuring four parameter variables of a metal sample comprising means for generating a first signal at a predetermined frequency, means for generating a second signal at a frequency different than said first signal but synchronized therewith, a test coil, a reference coil identical to said test coil, a reference sample having four parameters of known value, means for applying said first and second signals to said test and reference coils, means for balancing the received signals of said test and reference coils to give a null output for parameter values of said metal sample being equal to parameter values of said reference sample, a first filter having a selective bandpass at the frequency of said first signal, a second filter having a bandpass at the frequency of said second signal, the input of said first and second filters being connected to the output of said null balance means, a first amplitude-phase detector having its input connected to the output of said first filter, a second amplitude-phase detector having its input connected to the output of said second filter, means for providing a reference signal to said first and second amplitude-phase detectors from said first and second signal generating means respectively, the outputs of said first and second amplitude-phase detectors being proportional to the amount of the outputs of said first and second filters respectively which are in phase and in quadrature with their respective reference signal and hence proportional to the coefficients in a Fourier series expansion of the output of said null balance means, and means for combining the outputs of said first and second amplitude-phase detectors to give four outputs each responsive to one of said variable parameters of said metal sample.

References Cited by the Examiner

UNITED STATES PATENTS

| | | | |
|---|---|---|---|
| 2,034,501 | 3/1936 | Zuschlag | 324—34 |
| 2,744,233 | 5/1956 | Paivinen | 324—34 |
| 2,894,203 | 7/1959 | Cory | 324—40 |
| 2,950,435 | 8/1960 | Locher | 324—77 |
| 2,965,840 | 12/1960 | Renken et al. | 324—40 |
| 2,970,469 | 2/1961 | Feldman | 324—77 |
| 3,015,949 | 1/1962 | Arnold | 73—67.2 |

RICHARD B. WILKINSON, *Primary Examiner.*

WALTER L. CARLSON, *Examiner.*

F. A. SEEMAR, *Assistant Examiner.*